United States Patent
Trigonakis et al.

(10) Patent No.: US 12,505,101 B2
(45) Date of Patent: Dec. 23, 2025

(54) SHORTEST AND CHEAPEST PATHS IN DISTRIBUTED ASYNCHRONOUS GRAPH TRAVERSALS

(71) Applicant: Oracle International Corporation, Redwood Shores, CA (US)

(72) Inventors: Vasileios Trigonakis, Zurich (CH); Luigi Fusco, Zurich (CH); Arnaud Delamare, Zurich (CH); Jinsu Lee, San Mateo, CA (US); Ayoub Berdai, Sale (MA); Hugo Kapp, Zurich (CH); Ioannis Alagiannis, Zurich (CH); Vlad Ioan Haprian, Zurich (CH)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/522,611

(22) Filed: Nov. 29, 2023

(65) Prior Publication Data
US 2025/0173333 A1    May 29, 2025

(51) Int. Cl.
*G06F 16/2453* (2019.01)

(52) U.S. Cl.
CPC ................ *G06F 16/24535* (2019.01)

(58) Field of Classification Search
None
See application file for complete search history.

(56) References Cited

U.S. PATENT DOCUMENTS

| 11,675,785 | B2 | 6/2023 | Trigonakis et al. |
| 2019/0205737 | A1* | 7/2019 | Bleiweiss ............ G06N 3/063 |
| 2021/0209108 | A1* | 7/2021 | Haprian ............ G06F 16/9024 |

OTHER PUBLICATIONS

Wen Sun; SQLGraph: An Efficient Relational-Based Property Graph Store; ACM; pp. 1887-1901.*

(Continued)

*Primary Examiner* — Albert M Phillips, III
*Assistant Examiner* — Jermaine A Mincey
(74) *Attorney, Agent, or Firm* — Hickman Becker Bingham Ledesma LLP

(57) ABSTRACT

The present disclosure relates to various approaches for fast and scalable TOP K SHORTEST and CHEAPEST graph queries supporting horizontal aggregations on the group variables of a path in a distributed graph query engine. A distributed graph query processing engine may execute a graph query in a plurality of computing devices. A plurality of subjobs may be generated based at least in part on the graph query. Execution of an asynchronous pattern matching subjob of the plurality of subjobs may be initiated, and, in response to the asynchronous pattern matching subjob identifying one or more source vertices of a plurality of vertices, the execution of the asynchronous pattern matching subjob may be paused. An output context set comprising the one or more source vertices may be generated. Execution of a synchronous path matching subjob of the plurality of subjobs may be initiated, and a reachability map may be generated based at least in part on one or more matched paths between the one or more source vertices and one or more destination vertices of the plurality of vertices. The execution of the asynchronous pattern matching subjob may be resumed based at least in part on the output context set and the reachability map.

20 Claims, 10 Drawing Sheets

(56) References Cited

OTHER PUBLICATIONS

Trigonakis et al., "aDFS: An Almost Depth-First-Search Distributed Graph-Querying System", USENIX Annual Technical Conference, Jul. 14-16, 2021, 17 pages.
Roth et al., "PGX.D/Async: A Scalable Distributed Graph Pattern Matching Engine", Grades '17, Chicago, IL, USA, pp. 6.
R. Bellman, "On a Routing Problem", Quarterly of Applied Mathematics, 1958, 4 pages.
E. W. Dijkstra, "A Note on Two Problems in Connexion with Graphs", Numrische Mathematik 1, 1959, 3 pages.
Chong et al., "On Finding Single-Source Single_Destination k shortest Paths", Journal of Computing and Information, ICCI '95, Trent University, Peterborough, Ontario, Canada, Jul. 5-8, 1995, pp. 40-47.
"PGQL 1.5 Specification", Property Graph Query Language, Aug. 8, 2022, pp. 145, available: https://pgql-lang.org/spec/1.5/, retrieved: Feb. 16, 2024.

\* cited by examiner

SHORTEST AND CHEAPEST PATHS IN DISTRIBUTED ASYNCHRONOUS GRAPH TRAVERSALS

TECHNICAL FIELD

The present disclosure relates to executing distributed graph queries.

BACKGROUND

The shortest path problem involves finding a path within a graph with the smallest number of edge traversals. The cheapest path problem involves finding a path with the smallest global cost, where the cost is an arbitrary function. Both the shortest path problem and the cheapest path problem fall into the category of variable length path matching, where one or multiple paths composed of a repeating path pattern, or path step, are found. These patterns can be defined with normal fixed length path syntax and support filters. The number of repetitions of the pattern may be constrained with quantifiers. In the cheapest path problem, the cost may be evaluated at the path pattern level, may be summed up to obtain the global cost, and may be strictly positive. For this reason, cheapest is equivalent to shortest in the case of constant cost.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
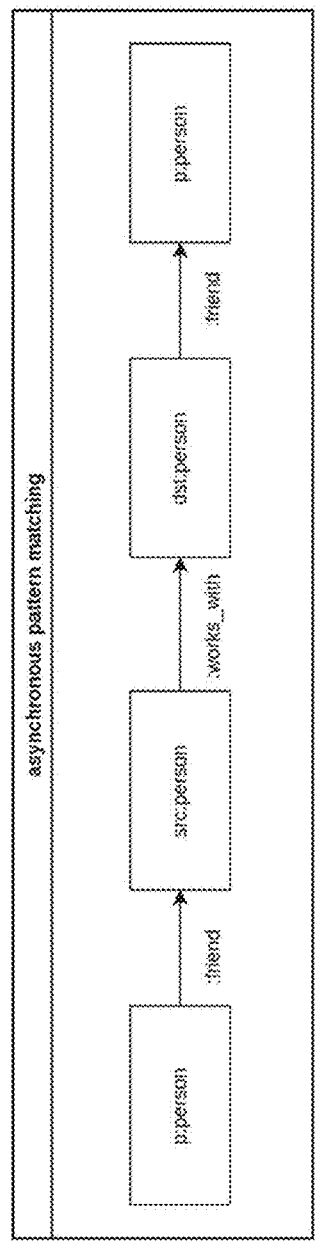
FIG. 1 shows an example of the instantiated stages of an example query.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present disclosure relates to various approaches for fast and scalable TOP K SHORTEST and CHEAPEST graph queries supporting horizontal aggregations on the group variables of a path in a distributed graph query engine. The disclosed approaches may be designed for interoperability with distributed asynchronous traversals and can achieve high performance while limiting memory usage by batching executions and saving intermediate results to disk.

The following is an example of a SHORTEST query:

```
SELECT ARRAY_AGG(p.name), COUNT(e)
FROM MATCH TOP 3 SHORTEST (src:Person) ((p:Person) -[e:knows]-
(:Person)){2,} (dst:Person)
WHERE src.name='Mario' AND dst.name='Luigi'
```

Example Query 1

This example SHORTEST query matches the three shortest chains of people through which Mario knows Luigi. In this case, we ask for paths that are of length 2 or longer, meaning we are interested in transitive connections only. The query outputs, for each path, the names encountered along the path as an array together with the length of the path.

The following is an example of a CHEAPEST query:

```
SELECT dst.name, SUM(e.distance)
FROM MATCH ANY CHEAPEST (src:City) ((:City) -[e]-> (:City)
COST e.distance)* (dst:City),
    MATCH (dst) -[:City_in_Country]-> (country:Country)
WHERE src.name = 'Milan' AND country.name = 'Italy'
```

Example Query 2

This example CHEAPEST query matches all Italian cities reachable from Milan passing through other cities, together with the travel distance, using travel distance as a metric to decide which path is cheaper.

The variables appearing in the path pattern are group variables. Group variables can be used to perform horizontal aggregations, like SUM, COUNT, or ARRAY_AGG, or output in multiple rows using the ONE ROW PER VERTEX or ONE ROW PER STEP statements.

ANY, ALL, and TOP K specifiers may be supported. ANY may match one random path among all equivalently long shortest paths. ALL may be supported by SHORTEST and may match all shortest paths. Thus, if multiple shortest paths with the same length exist, then all of them may be matched. TOP K may match at most K shortest paths (with increasing length). If there exist a greater number of equivalent paths than the number of paths that should be returned, then the query may not guarantee which paths will be returned.

There may be, for instance, two methods of outputting path information: horizontal aggregations and multiple rows per match. Horizontal aggregations may behave like normal aggregations but operate on the group variables that make up the path pattern. An alternative to outputting multiple rows per match may be outputting one row per matched vertex in a path using ONE ROW PER VERTEX or outputting one row per matched path step in a path using ONE ROW PER STEP.

Path finding algorithms may involve the execution of synchronized steps and may use complex data structures like maps, for example. Algorithms like breadth-first search perform parallel work but in synchronous steps. Algorithms like Dijkstra's algorithm may perform many comparisons, which may require complex synchronization and communication, especially for data structures on distributed graphs. These algorithms may make strong assumptions about the characteristics of the graph, which may not fit the requirements of queries on property graphs that have advanced features like the computation of filters and the output of results. In addition, these algorithms may be designed for simple execution, where the user requests the shortest or cheapest paths between two or more vertices.

In graph queries, however, the shortest and cheapest path finding problems may be solved as part of a bigger user-defined query: the starting vertices might be discovered at runtime through preliminary pattern matching, filters may be used to specify the characteristics of the path, and aggregations may be used to project data from the path and use it in later parts of the query. Working in a distributed setting—where data is scattered across multiple machines and communication is used to traverse the graph-complicates the problem even further. Thus, for graph queries, shortest and cheapest path algorithms can be integrated and extended function in a graph query engine.

In general, graph queries present a challenging workload because they may focus on edges, i.e., the connections in the data. Therefore, executing graph queries might involve exploring immense numbers of intermediate results, causing queries to quickly explode in terms of memory usage. In addition, graph queries may exhibit irregular access patterns with limited locality because the query patterns and the connections in the data may dictate the accesses. In a distributed system, neither breadth-first traversal (BFT) nor depth-first traversal (DFT) is suitable because of the limited locality and the large size of graphs.

The disclosed asynchronous distributed graph query engine may efficiently incorporate shortest path matching and cheapest path matching algorithms (or any other variable length path matching algorithm) in asynchronous hybrid pattern matching queries for improved performance, scalability, and memory control.

The asynchronous distributed graph query engine may enable fast, scalable, and memory-controlled SHORTEST and CHEAPEST queries in an asynchronous distributed query engine. To that end, the asynchronous distributed graph query engine may combine asynchronous pattern matching with patch matching algorithms like, for example, breadth-first search (for SHORTEST queries), or Dijkstra's algorithm and the Bellman-Ford algorithm (for CHEAPEST queries, and generally any path-finding algorithm). To support the diverse nature of graph queries, path matching algorithms may be customized to support multi-source, multi-destination, and top k path matching. Features and optimizations like, for example, frontier deduplication and reverse reachability maps may be enabled for path matching algorithms. Interfacing between asynchronous pattern matching and the shortest and cheapest path algorithms may be accomplished generically by sharing common data structures containing data like partial results and reachability indices. Additionally, for matching complex path finding patterns, asynchronous pattern matching may be used in bulk-synchronous algorithms.

The asynchronous distributed graph query engine may overcome the inherent limitations of an asynchronous pattern matching engine by separately executing parts of a graph query (like matching paths and creating a reachability map). Separate execution of different parts of the query may enable combinations of different programming models, and to use what fits best the algorithms to implement instead of being limited to a single mode of operation. In the case of SHORTEST and CHEAPEST, the query mixes asynchronous distributed graph traversals with bulk synchronous distributed algorithms. Having a uniform way of communicating between different parts of the query by sharing data structures enables implementation of novel algorithms and pattern matching features. The data structures introduced for SHORTEST and CHEAPEST can potentially be used for any path finding algorithm, as well as for reachability queries. Synchronization may enable operations on partial results, such as deduplication.

Asynchronous Distributed Graph Query Engine

The asynchronous distributed graph query engine may implement queries in two phases: an asynchronous pattern matching (GROUP BY) and bulk synchronous result modification (ORDER BY). During asynchronous pattern matching, computation may proceed in a depth-first manner, favoring the execution of deeper stages. A single query may be divided into stages. Each stage may represent the processing of a single vertex (e.g., matching the vertex depending on whether it satisfies possible filters in the query). During the execution of a fixed path length query, stages advance sequentially, transitioning from a stage (a vertex) to the next stage (a next vertex) via hop engines (through an edge between the vertices).

Consider the following graph query as an example:

```
SELECT ID(p), ID(src), ID(dst) FROM
MATCH (p:person) -[:friend]-> (src:person),
MATCH (src) -[e:works_with]-> (dst:person),
MATCH (dst) -[:friend]-> (p)
```

Example Query 3

Example Query 1 matches a triangle pattern that includes a person and two friends of that person who are direct colleagues.

FIG. 1 shows an example of the instantiated stages of Example Query 1. Execution of the query may begin with a first stage-which may include matching a first vertex variable—for each vertex of a graph, where each computing device of one or more computing device may begin execution from vertices that are local to that computing device. Execution of the query may then "hop" from every vertex that has been matched. In an asynchronous distributed graph query engine, any hop along an edge may result in the transfer of computation from one computing device to another computing device.

For this reason, the asynchronous distributed graph query engine may use a per-stage per-computing device context. A context may represent the minimum amount of data used to complete a query from a particular point onward. At a particular stage, data that may be used later in the query may be included in a context, either for the evaluation of future filters or in the output of the query. And at a particular stage, data used to evaluate filters originated in a preceding stage may be obtained from the context. Thus, the context may represent a partial result of a query, and the context may include information used to continue with pattern matching. When computation is transferred from a first computing device to a second computing device, some computation may still continue locally on the first computing device, asynchronously with respect to computation that was transferred to the second computing device. An asynchronous execution model may have advantages in flexibility, speed, and memory usage, but it may not fit queries that involve heavy synchronization of distributed data structures or global states.

Thus, disclosed approaches may implement efficient and fully functional SHORTEST and CHEAPEST queries within an asynchronous distributed graph query engine. The asynchronous distributed graph query engine may include bulk synchronous parallel path matching algorithms that divide the asynchronous pattern matching execution of a graph query.

The asynchronous distributed graph query engine may divide the execution of a graph query into multiple units of work. For instance, a query may include the synchronous execution of one or more subjobs. Inside the single subjob, any mode of execution may be supported.

The asynchronous distributed graph query engine may enable interfacing between asynchronous pattern matching and bulk synchronous parallel algorithms. Because subjobs may be synchronous blocks, specific interfaces and data structures may be introduced to divide execution of a query into multiple sections. The communication between different subjobs may be performed by sharing common data structures. Variable length path finding algorithms may efficiently start from the results of previously executed asynchronous pattern matching subjobs and may perform preprocessing like frontier deduplication. Asynchronous pattern matching can continue from previously generated partial results. Subjobs can have complex output like reachability indices and path data, which can be used in later subjobs.

As a result, a single query may be split into a sequence of subjobs chained together by specific combinations of output stages, bootstrap stages, and intermediate data structures. Passage of execution from one subjob to the next may act as a synchronization point. This is enabled by an efficient pause and resume mechanism on the pattern matching side, which may allow pattern matching to pause at a specific point in time and resume at a later point in execution of the query.

Queries Divided into Multiple Subjobs

Consider now the following example query, which is a modification of Example Query 1 above:

---

SELECT ID(p), ID(src), ARRAY_AGG(ID(e)), COUNT(e), MAX(e.name), ID(dst) FROM
MATCH (p:person) -[:friend]-> (src:person),
MATCH SHORTEST (src) ((:person) -[e:works_with]-> (:person))* (dst:person),
MATCH (dst) -[:friend]-> (p)

---

Example Query 4

Example Query 2 finds loops, matching one person together with two friends, as well as the shortest path made of "works_with" between the two friends. Example Query 2 may include an initial asynchronous matching phase (p to src), followed by a shortest paths algorithm, and concluded by another asynchronous matching phase. The data ID(p), ID(src), and ID (dst) may be collected by the asynchronous distributed graph query engine, while the horizontal aggregations ARRAY_AGG(ID(e)), COUNT(e), and MAX (e.name) may be calculated as part of synchronous path matching.

Figure 2:
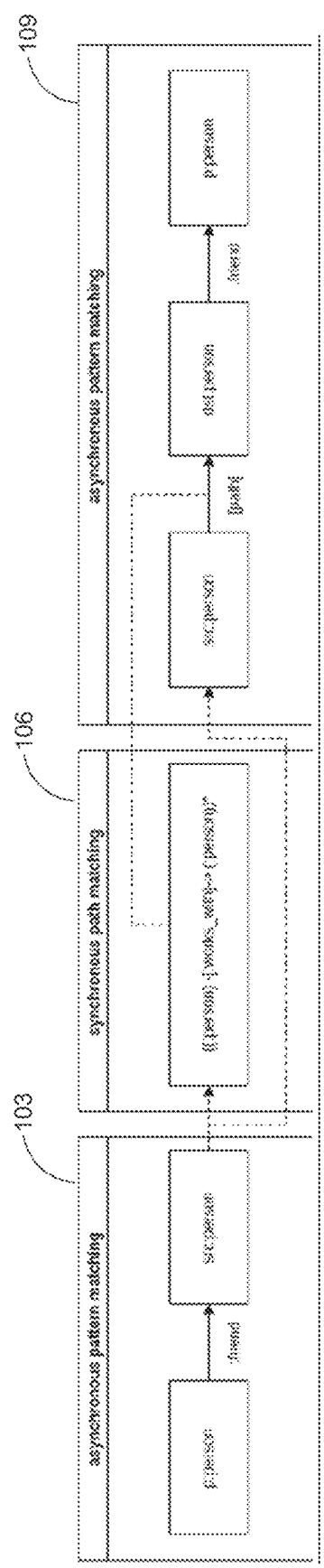
FIG. 2 shows an example of a division of a query into multiple subjobs.

FIG. 2 shows an example of how the query may be divided into multiple subjobs, each one communicating directly with the next one. The subjobs may synchronize at the start of execution. A subjob may use the data produced by previous subjobs. The example of FIG. 2, the first asynchronous pattern matching subjob 103 may generate a list of contexts together with the last matched vertex. The synchronous path matching subjob 106 may extract an initial frontier from the contexts of the preceding asynchronous pattern matching subjob to perform a multi-source search and build a reachability map. The second asynchronous pattern matching subjob 109 may resume execution of the query from the contexts saved by the first asynchronous pattern matching subjob 103. The second asynchronous pattern matching subjob 109 may use the reachability map to perform hops between source vertices and destination vertices. Horizontal aggregations may be computed during the synchronous path matching subjob 106. These horizontal aggregations may be included in a context associated with the asynchronous pattern matching subjob 109 for later evaluation of filters and for output of the query.

The disclosed asynchronous distributed graph query engine may provide a common interface for path finding algorithms. To that end, hop engines and bootstrap stages may handle terminating the execution of a subjob upon pausing execution of a query, storing the partial results of the subjob, and initiating another subjob upon resuming the query using the partial results of the previous subjob. As an example, the shortest path finding algorithm and the cheapest path finding algorithm may produce a reachability map. This reachability map may be used to map source vertices to all reachable destination vertices, as well as the contents of the matched paths. A reachability map may therefore be a data structure that is used to facilitate communication between the synchronous path matching subjob 106 and the second asynchronous pattern matching subjob 109. A hop engine responsible for jumping to vertices based on the content of the reachability map may be created to bootstrap execution of the resumed query.

Different subjobs may be specialized to implement specific functionalities. A subjob superclass may the main communication interfaces between subjobs and regulates the exchange of data structures. After the execution of a subjob, a method responsible for transferring the output of that subjob may be invoked. This method may move the output data structures of a current subjob to the input data structures of a following subjob. That way, the output of one subjob can be used as input of another.

In addition, measures like batched execution may be implemented at each subjob boundary to improve memory consumption. To illustrate, during a subjob's bootstrapping stage, the vertices or contexts processed by the subjob may be divided into one or more batches. Each batch may be executed in turn and the accumulated results may be combined after each batch has been executed. For example, a plurality of vertices of a graph may be divided into multiple equal batches, and the query may be executed one batch at a time during each subjob. As another example, a subjob may divide input contexts from a previous subjob into multiple batches, and the subjob may bootstrap on each batch in turn and execute the query once for each batch. Batched execution may therefore used to limit the memory by a subjob at any one particular point.

Asynchronous Distributed Graph Query Engine

Figure 3:
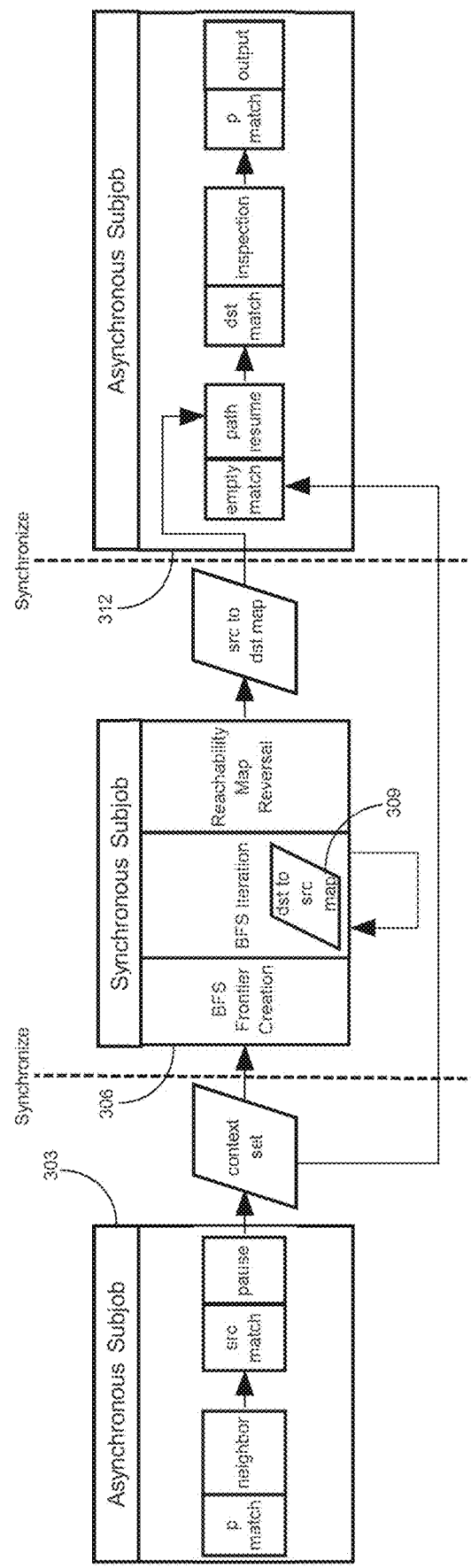
FIG. 3 shows an example method for executing a SHORTEST or CHEAPEST graph query in an asynchronous distributed graph query engine.

FIG. 3 depicts an example method for executing a SHORTEST or CHEAPEST graph query in an asynchronous distributed graph query engine. The asynchronous distributed graph query engine may combine asynchronous pattern matching with synchronous path matching algorithms. The execution of fixed length pattern matching sections of a query may be handled by the asynchronous pattern matching engine, while shortest and cheapest paths are computed through synchronized path matching algorithms. The asynchronous distributed graph query engine may also accommodate any programming model within a particular subjob. The flowchart of FIG. 3 provides merely an example of the many different types of functional arrangements that can be employed to implement the operation of the depicted portion of the asynchronous distributed graph query engine.

At step 303, the first asynchronous pattern matching subjob is performed to generate initial partial results of a graph query. In the context of multiple-subjob queries, asynchronous subjobs may be responsible for pattern matching. The first asynchronous pattern matching subjob may perform pattern matching. For example, a pattern like "(a)→(b)→(c)" may result in the creation of three asynchronous stages and one asynchronous subjob. The first asynchronous pattern matching subjob may bootstrap the query, executing a first stage of the first asynchronous pattern matching subjob on all source vertices. Asynchronous pattern matching may be performed until source vertices for the variable-length path finding subjob are matched. The first asynchronous pattern matching subjob may include a contiguous subset of stages. The execution of the asynchronous distributed graph query engine may be synchronized in a final stage of the first asynchronous pattern matching subjob. To pause execution of the query, contexts representing partial results of the first asynchronous pattern matching subjob may be stored within a context set data structure. These contexts may be used to bootstrap computation within a second asynchronous pattern matching subjob. In an embodiment, the asynchronous distributed graph query engine may identify frontier vertices and perform deduplication.

The first asynchronous pattern matching subjob may also improve memory consumption by implementing batched execution. During the initial bootstrapping of the query, the vertices of the graph may be divided into a plurality of equal batches of vertices. The asynchronous pattern matching subjob may then perform bootstrapping and pattern matching on each individual batch of vertices in turn, and the partial results for each batch may be combined within the context set data structure when the query is paused.

At step 306, the synchronous path matching subjob is executed to match paths. For example, the synchronous path matching subjob can execute a shortest path algorithm, a cheapest path algorithm, or any other path matching algorithm, depending on the query. The synchronous path matching subjob may extract source vertices from the context data generated at step 303. Using this context data, the synchronous path matching subjob may find possible destination vertices and identify paths connecting the source vertices to those possible destination vertices. The synchronous path matching subjob may perform this search according to, for example, a TOP K specification, path quantifiers, and path pattern filters. Synchronization may enable implementation of features such as frontier deduplication and avoidance of work repetition in multi-source searches.

The synchronous path matching subjob may also improve memory consumption while performing path matching. For example, at least some matched paths may be saved to disk during execution of the synchronous path matching subjob. Older paths may be saved to disk and later accessed when the query is resumed, while paths that are being extended may be accessed from memory. Shorter paths may also be saved to disk without sacrificing the performance of the synchronous path matching subjob and accessed when execution of the query is resumed. In addition, the synchronous path matching subjob may implement batched execution by dividing the source vertices extracted from the first asynchronous pattern matching subjob into a plurality of batches and performing path matching using each batch in turn.

At step 309, a reachability map is generated. The reachability map may be generated, for instance, based on the results of step 306. As an example, the reachability map may include each found destination vertex reachable from the initial source vertices matched at step 303, as well as the matched paths. This reachability map may be used to map source vertices to all reachable destination vertices, as well as the contents of the matched paths. A reachability map may therefore be a data structure that is used to facilitate communication between the synchronous path matching subjob and the second asynchronous pattern matching subjob. Horizontal aggregations may be computed during the synchronous path matching subjob. These horizontal aggregations may be included in the context associated with the first asynchronous pattern matching subjob for evaluation by the second asynchronous pattern matching subjob.

At step 312, the second asynchronous pattern matching subjob may resume execution of the query from the context data generated at step 303. Horizontal aggregations computed at step 306 are integrated with the matched paths in the context set of the first asynchronous pattern matching subjob. Or the case of multiple-rows-per-match queries may include duplicating the contexts inserting the single data elements relative to the path. A hop engine responsible for jumping to vertices based on the content of the reachability map may be created to bootstrap execution of the resumed query. The hop engine may jump from source vertices to destination vertices according to the reachability map. The rest of the query may then be matched until output is generated.

The second asynchronous pattern matching subjob may also improve memory consumption using batched execution. For example, the context data from the first asynchronous pattern matching subjob may be divided into a plurality of batches. The second asynchronous pattern matching subjob may then execute the query on each of the batches of context data one at a time.

Pausing and Resuming Queries

Figure 4:
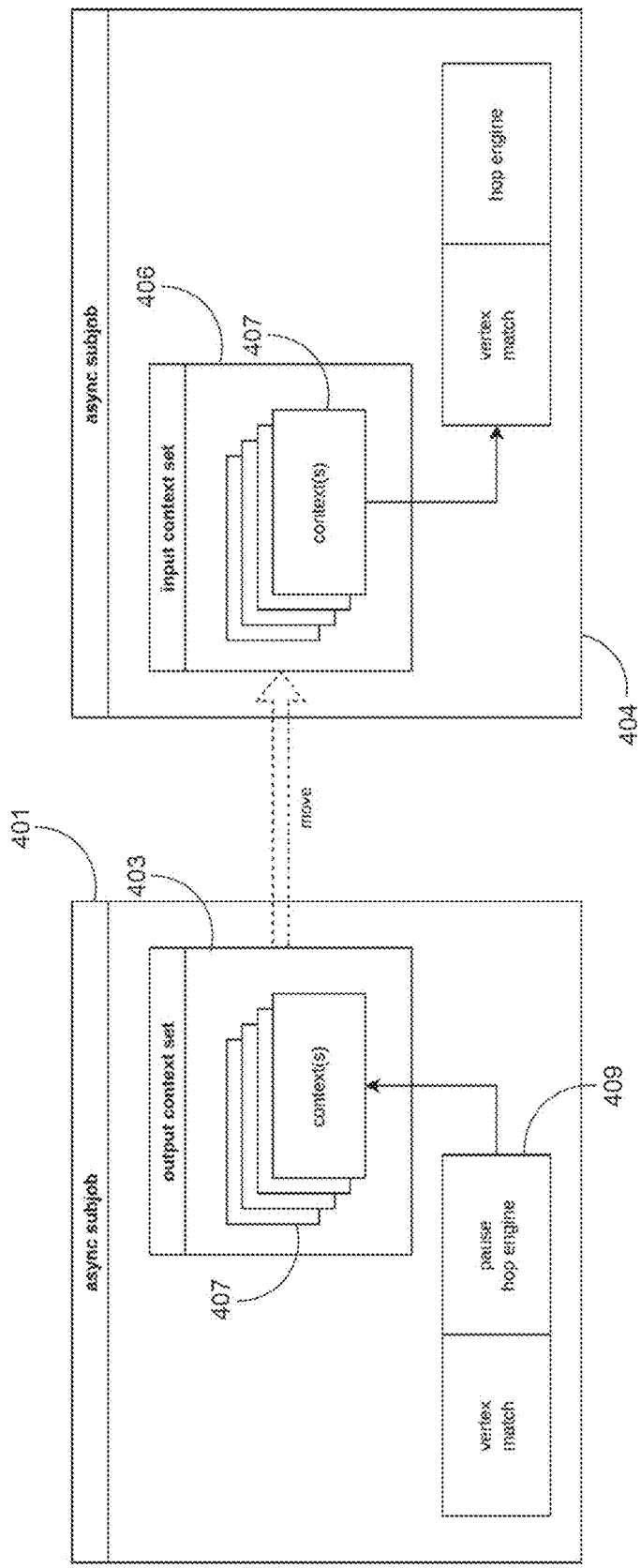
FIG. 4 shows a block diagram that illustrates pausing and resuming queries using context sets.

FIG. 4 shows a block diagram that illustrates pausing and resuming queries using context sets. In the disclosed approaches, every subjob may be associated with an output context 406 set and an input context set 406. A context set data structure may be implemented as a grow-only array. A context set may store materialized contexts 407. The hop engine 409 responsible for pausing execution of the query may serialize the contexts 407 into a message and insert it into the output context set 403 data structure. The context set data structures may support bulk allocation and logic to serialize and deserialize the contexts.

When the query is paused, the output context set 403 data structure may be populated with the contexts 407 materialized by the final stage of a currently executing subjob 401. When the query is resumed, the contexts 407 previously stored in the output context set 403 data structure may be used to bootstrap the execution of a following subjob 404.

Before execution of the following subjob 404, contexts 407 from the output context set 403 of an immediately preceding subjob 401 may be moved into the following subjob's 404 input context set 406. That way, the following subjob 404 may bootstrap from the contexts 407 materialized by the previous subjob 401. This allows the preceding subjob 401 to use and alter the contexts 407 in any way, as long as it provides a valid set of contexts 407 to the following subjob 404 from which the following subjob 404 may bootstrap.

A query may be paused similarly to how a query is terminated. Instead of a hop engine calling a next stage or sending a message, the task of pausing may be assigned to the pause hop engine 409. On invocation, the pause hop engine 409 may store contexts 407 for a current subjob 401 in an output context set 403 for the current subjob 401. The contexts 407 from the output context set 403 may then be moved to an input context set 406 of a following subjob 404. The following subjob 404 may bootstrap using these saved contexts 407. For instance, the following subjob 404 may bootstrap by iterating on the contexts 407 of the input context set 406. The input context set 406 may therefore support an iterator-like behavior.

This pausing mechanism may also enable improved memory consumption by the asynchronous distributed graph query engine. For instance, contexts 407 may be "spilled to disk" when high memory consumption is detected. The contexts 407 within the output context set 403 may be serialized to disk, as the contexts 407 are materialized while execution of the query is paused.

Subjob Creation

Figure 5:
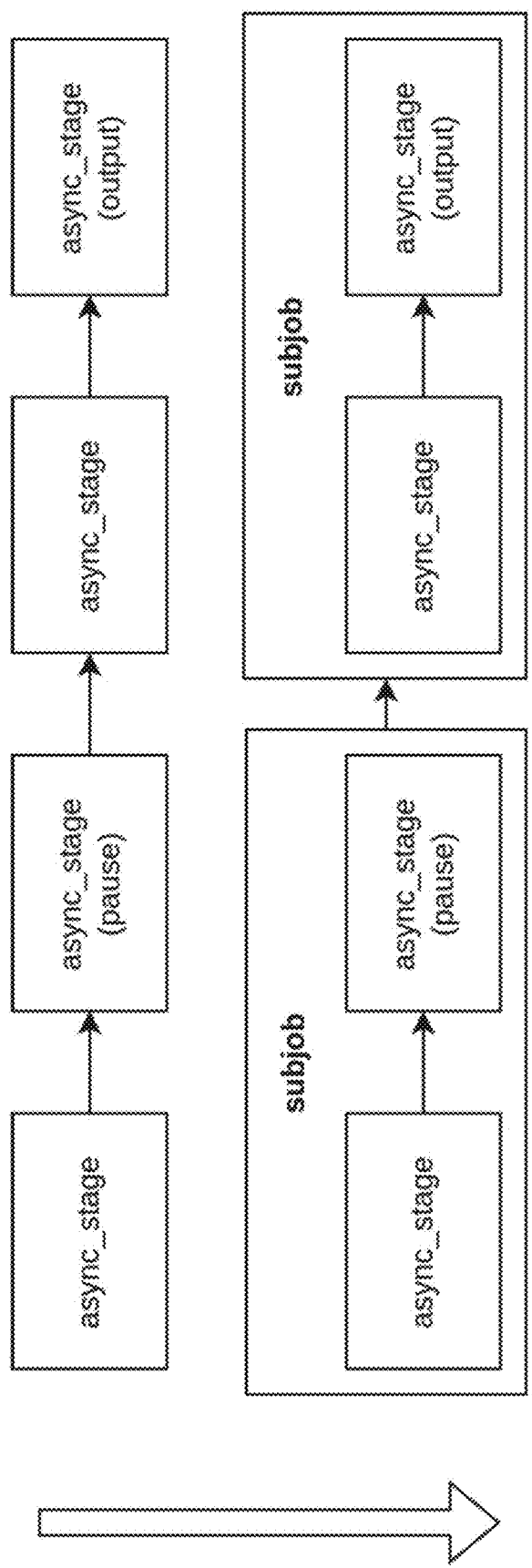
FIG. 5 shows an example of a block diagram illustrating the creation of a chain of subjobs.

FIG. 5 shows an example of a block diagram illustrating the creation of a chain of subjobs. A query interpreter of the asynchronous graph pattern matching engine may analyze the query to generate a sequence of asynchronous stages. To support queries that include multiple subjobs, chain of subjobs may be constructed that may be executed inside a subjob orchestrator. Due to the computation of dependencies between stages for the definition and allocation of context data, a complete chain containing all of the asynchronous stages may still be created. At runtime, each subjob may execute a contiguous portion of chain of stages. Contiguous subjobs execute contiguous subchains of the chain of stages. Multiple subjobs may communicate with each other by sharing context set data structures. And in the case of particular queries, additional subjobs may be added to the chain of subjobs. For example, in the cases of SHORTEST and CHEAPEST queries, algorithms for finding shortest and cheapest paths may be introduced as subjobs in the chain in between two asynchronous pattern matching subjobs.

Resuming after a Variable Length Path Subjob

A variable-length path matching subjob may output a reachability map. A reachability map may represent a multimap of the type "<src,dst>", where one source vertex may be associated multiple destination vertices (as discussed in step 312 of FIG. 3). The associated destination vertices may include those destination vertices that are reachable from the source vertex while respecting the variable length path pattern used in the SHORTEST and CHEAPEST queries.

When resuming execution of a query, hop engines that match fixed length patterns may iterate over a list of neighbor vertices of a current vertex to execute a remainder of the query.

Variable length path patterns may generalize the concept of a neighbor vertex to any vertex that can be reached through a pattern specified in the query. The hop engine responsible for jumping from source vertices to the reachable destinations may iterate on a reachability map instead of the list of neighbors. The first asynchronous pattern matching subjob may save a context locally to the last matched source vertices. This means that the following subjob may bootstrap using the contexts that are saved on a computing device containing the source vertex. A path resume hop engine may use the source node as a key to check the reachability to identify identifies of all vertices that the path resume hop engine may jump to.

Consider the following example query:

---

SELECT ID(p), ID(src), ARRAY_AGG(ID(e)), COUNT(e),
MAX(e.name), ID(dst) FROM
MATCH (p:person) -[:friend]-> (src:person),
MATCH SHORTEST (src) ((:person) -[e:works_with]-> (:person))*
(dst:person),
MATCH (dst) -[:friend]-> (p)

---

Example Query 3

In Example Query 3, a first asynchronous pattern matching subjob may match all source vertices from which to initiate a path search. The final hop engine of this portion of Example Query 3 may be the pause hop engine, which may materialize and save the partial results of the first asynchronous pattern matching subjob into a context set. The synchronous path matching subjob may extract context data from the context set and find possible destination vertices. Likewise, the synchronous path matching subjob may identify paths connecting the source vertices and possible destination vertices. The synchronous path matching subjob path subjob may perform this search according to, for example, a TOP K specification, path quantifiers, and path pattern filters.

Execution of the synchronous path matching subjob may result in a reachability map. The reachability map can comprise, for example, a two-layer multimap. In the reachability map, each source vertex may be associated with multiple destination vertices, and multiple paths (up to K paths, according to the query c) may be associated with each source-destination pair. The reachability map may be distributed and constructed so that the source vertices are local, thereby enabling direct local lookup of the destinations and the paths associated with the source vertices.

The bootstrap phase of the second asynchronous pattern matching subjob may iterate on the context set from the first asynchronous pattern matching subjob. During each stage of this bootstrap phase, a path resume hop engine may detect a source vertex on which the resumed context was saved, identify all destination vertices associated with that source vertex, and jump to those destination vertices. In addition, the path resume hop engine may populate the resumed context with path aggregation data collected during the synchronous path matching subjob. To account for multiple matched paths for each destination vertex, the path resume hop engine may jump up to K times to each destination vertex. Each jump to a destination vertex may result in different horizontal aggregations being included in the resumed context. Thus, the number of performed jumps may have an upper limit K, which may represent the number of destination vertices reachable from the source vertex.

Handling Output

One difference between reachability queries and SHORTEST and CHEAPEST queries may be in outputting data belonging to the matched path(s). Path data may be extracted through some sort of aggregation, which can be, for instance, a fixed size aggregation (e.g., COUNT and SUM) or variable size aggregation (e.g., LISTAGG and ARRAY_AGG). The synchronous path matching subjob may be provided with information regarding what data to collect during path traversal.

A distinction may be made between "global aggregations" and "horizontal aggregations." Horizontal aggregations may be expressed like other aggregations, but the variable references of horizontal aggregations may be associated with the path pattern specified in the query. For performance and architectural reasons, and to support filters, these aggregations may not be performed when generating output for a query. Instead, these aggregations may be performed directly by the path matching algorithm during the synchronous path matching subjob.

Horizontal aggregations may include aggregations from the point of view of the path, though the horizontal aggregations may act as simple properties in the rest of the query. Thus, it may be possible to have nested aggregations in a SELECT statement of a query. An inner nested aggregation may be a horizontal aggregation, and the outer nested aggregation may be a global aggregation or a group—by aggregation. In Example Query 3, the example query may, for example, output an identifier for each sum of the lengths of the two shortest paths connecting every source-destination pair, together with the longest e.name identified on each path and all identifiers of the traversed edges as an array aggregation.

During the expression resolution phase of a query—where the asynchronous distributed graph query engine processes and evaluates expressions within the query-horizontal aggregations may be handled as variable references and be tracked as data dependencies to be included in a context. To do so, the horizontal aggregations may be treated as context variables. To include the aggregations in the context, the asynchronous distributed graph query engine may support variable length data.

Horizontal aggregations may be top-level aggregations or they may be nested inside other aggregations. If an aggregation is nested inside another aggregation, the inner aggregation may be a horizontal aggregation. If a horizontal aggregation appears as a top-level aggregation, the query itself may be designated as a non-aggregation query. By using a combination of this information, horizontal aggregations may be easily and reliably detected.

Path Context

Horizontal aggregations may be computed inside the shortest path algorithm. Horizontal aggregations may be collected at fixed points during the shortest path algorithm. Since horizontal aggregations may reference at most one variable at a time, aggregand expressions may not combine data coming from multiple vertices and edges. The aggregand expressions may be fully evaluated locally and included in a variable length context. This limitation, however, may serve to simplify description of this process-thus, the process may be generalized to support operations over multiple path variables.

A path context may be constructed using, for example, one of two approaches. In the first approach, all aggregations may be treated as array aggregations. Thus, the various aggregands may be collected during exploration of the graph. The final reduction may be lazily evaluated because execution of the main query is resumed. For example, if the query selects SUM(e.prop), with e being the path edge, the shortest path algorithm may collect the e.prop values encountered during the path. The shortest path algorithm may then perform the SUM of the e.prop values.

The second approach may take into account that non-string aggregations like SUM, AVG, MAX with a numeric argument have fixed size and can be calculated eagerly, while the path context traverses vertices. This case may be optimized by dividing a context into three sections—fixed-size metadata, a variable-length section, and a "fixed-size aggregation" section between the fixed-size metadata and the variable size section. The aggregations may be initialized when the path context is first created, and then updated eagerly as the shortest path algorithm is executed.

In the cases of ARRAY_AGG and of aggregations containing the DISTINCT keyword, distinct uncollapsed values may be saved and the aggregation may be computed in the end. Doing so may simplify dealing with aggregations with unknown size like, for example, the MIN and MAX of a string.

The aggregand for a horizontal aggregation may be, for instance, a scalar or a string. Scalar values may occupy a fixed size. Strings may be saved as a fixed size header followed by the contents of the string. Because a path context may be "append only," the aggregations may alternate and are divided into blocks of increasing depth.

Figure 6:
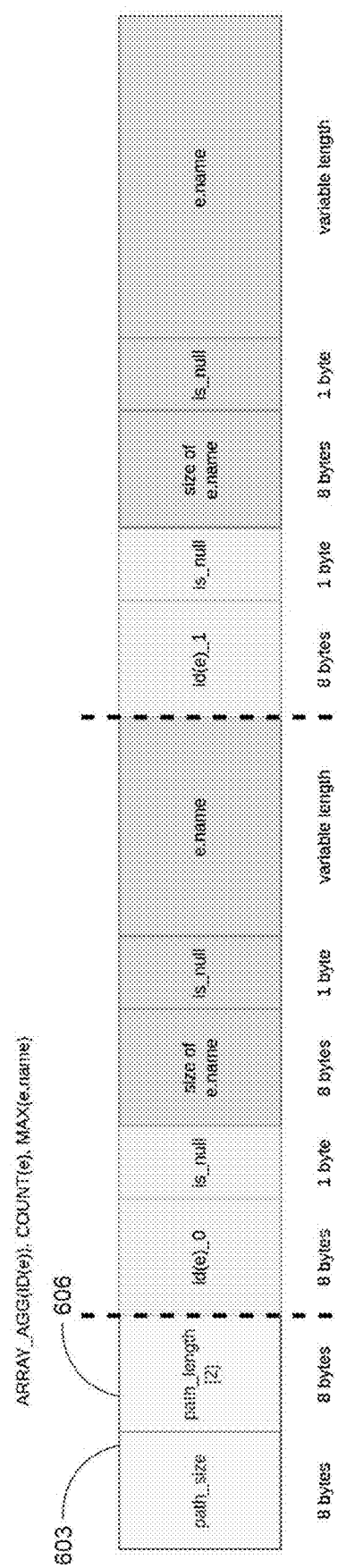
FIG. 6 shows an example of a path context that is built for an example query.

FIG. 6 shows an example of a path context that is built for Example Query 3. In this case, the aggregations that evaluate their aggregand are an array aggregation and a MAX aggregation on a string property. Thus, FIG. 6 may be the same for both the first approach and the second approach. "path_size" 603 may represent the size in bytes of the variable-length section of the path context. "path length" 606 may represent the length of the path; that is, a number of hops the path has traversed during execution of the shortest path algorithm. In the example of FIG. 6, the "path length" 606 is two.

Path Resume Hop Engine

A path resume hop engine can represent the first stage in the asynchronous subjob responsible for resuming execution of the query after the path matching subjob a path. The path resume hop engine may transfer the input context from the source vertex to all matched destination vertices. In doing so, the path resume hop engine may also consider any horizontal aggregations that are requested in the output and produced during the execution of the path matching subjob. These horizontal aggregations may be replicated. For example, when matching TOP 2 SHORTEST, the path matching subjob may match up to two paths for every source-destination pair. To propagate the matched paths, the path resume hop engine may jump multiple times to a same destination vertex, inserting different data in the context on each jump.

Figure 7:
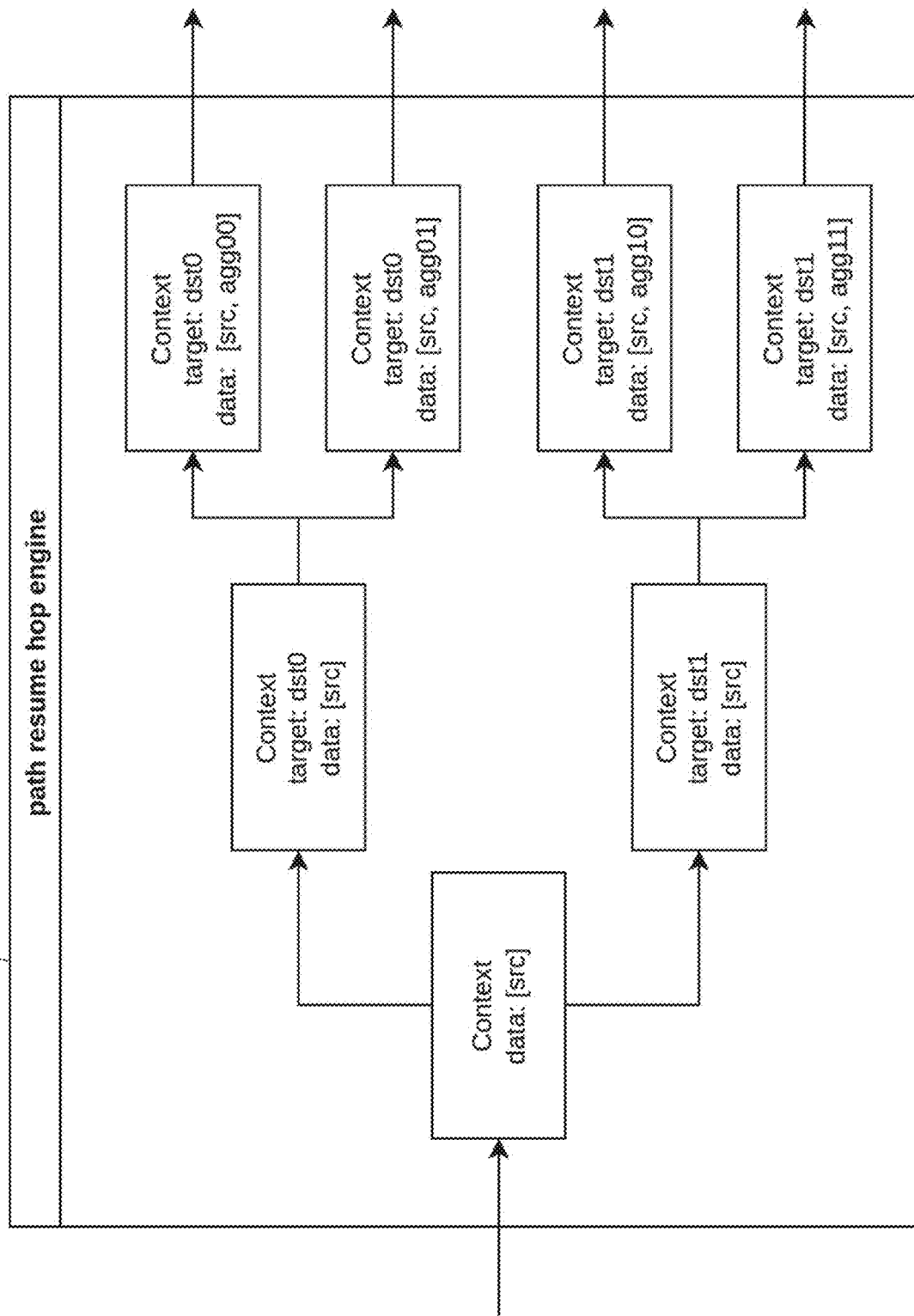
FIG. 7 shows an example representation of the general execution of a path resume hop engine.

FIG. 7 shows an example representation of the general execution of the path resume hop engine 700, in the case of TOP 2 SHORTEST. The example of FIG. 7 shows the symbolic execution of the path resume hop engine resuming 700 from a source vertex. The shortest path search ends with two vertices reachable from the source vertex, first destination vertex and second destination vertex. For every source-destination pair, the shortest path algorithm found two paths. For each matched destination for each matched path, the path resume hop engine 700 has jumped to a next stage once, resulting in four total jumps.

Based on the chosen approach at building the path contexts, path contexts may contain, for example, the already-computed aggregations or the uncollapsed aggregations. Already-computed aggregations may be copied to the asynchronous context. If the path context contains uncollapsed aggregations, then an additional step may be performed. This means that, for example, in the case of SUM, the path context may include all elements to be summed, together with all elements requested by other aggregations. When execution of the query is resumed, the path resume hop engine 700 may compute the actual aggregation values to be serialized and included in the path context. Uncollapsed aggregations may be used in the case of aggregands marked by the DISTINCT keyword. The aggregation computation logic in the path resume hop engine 700 may discard repeated values to calculate a correct result.

Filters containing references to horizontal aggregations with data that is already available may be evaluated when execution of the query is being resumed. For example, a comparison with a constant or a value already collected in the context from a previous vertex may be evaluated at this point.

Number of Rows Per Match

Fixed-length patterns may output one row per pattern match because they have no group variables. In examples where variable length patterns support horizontal aggregations like SHORTEST and CHEAPEST, data may be extracted from group variables as aggregations. In examples that involve a higher level of granularity, statements like, for example, ONE ROW PER VERTEX and ONE ROW PER STEP may output single values along a path.

ONE ROW PER VERTEX and ONE ROW PER STEP may include defining alias variables that can be used inside the corresponding SELECT statement. These alias variables may represent vertices and edges along a path. For example, "ONE ROW PER STEP (a, b, c)" may define variables a, b, and c, representing the source vertex, the edge, and the destination vertex of each path step, respectively. This also means that the value of "c" for one step is equivalent to the value of "a" for a following step.

These alias variables may also support the MATCH_NUMBER and the ELEMENT_NUMBER functions. The MATCH_NUMBER function may output a unique identifier that identifies a match to which the variable belongs. The ELEMENT_NUMBER function may output an ordinal of an element inside a single path. Multiple elements may therefore have a same MATCH_NUMBER but a different ELEMENT_NUMBER.

The ONE ROW PER VERTEX and ONE ROW PER STEP functions may be supported in a similar way as the output of horizontal aggregations of multiple paths. The synchronous path matching subjob may build paths as array aggregations to make them available inside the reachability map. The path resume hop engine may replicate the contexts, iterating on the array aggregation and populating the contexts with different data during each iteration before proceeding to a following stage.

Shortest Paths

For SHORTEST queries, the synchronous path matching subjob may implement different shortest path matching algorithms that may be optimized for different problems. For example, a single source, single destination algorithm may enable finding the shortest path connecting two given vertices. As another example, a single source, multiple destination algorithm may initiate a search from one fixed vertex to find the paths to many or all vertices in a graph. As an additional example, source algorithms may optimize a search by sharing work and execute path matching from multiple vertices simultaneously. Complex path patterns, including multi-hop steps and cross filtering, may be implemented by introducing stages within the synchronous path matching subjob, as a way to jump from source vertices to destination vertices in between synchronized steps.

A shortest path algorithm may support, for example, multiple source vertices, multiple destination vertices, multiple paths between any source-destination pair, and constraints on the minimum and maximum length of paths. To do so, the shortest path algorithm may include a modification of a breadth-first search algorithm, allowing a single vertex to be visited multiple times. The shortest path algorithm may construct a source-destination multimap and store enough information to collect data along the found paths at a later stage.

A breadth-first search algorithm may be modified so that a single node may be visited at most K times (instead of only once). The search may stop if no more vertices are visited, meaning that all destinations and paths have been found. For single-destination searches, the search may also stop if the destination vertex is visited K times. To support path quantifiers, the K may represent a number of paths that respect the path quantifiers.

Distributed Parallel Multi-Source K Breadth-First Search

A distributed, parallel, multi-source K breadth-first search algorithm may be performed in parallel from multiple sources, which may lead to better use of computational resources and of messaging. The breadth-first search algorithm may construct a reachability map. The reachability map may show which vertices are reachable from a given source vertex according to given path specifiers, as well as at most K paths for each source-destination pair. Each path may have a length as well as an associated path context, as discussed above. The length of a path may be given by a number of edges that make up the path. A path's associated context may include the data that is collected along the path. This data may be a form of aggregation. Aggregations like SUM and COUNT may involve a fixed slot in the path context, while LISTAGG and ARRAY_AGG may involve a variable length context.

An aggregation may be computed using data collected while constructing a path. An aggregation may contain an expression, which may refer to one or more query symbols that are found along the path. A dependency resolution may define a description of the variable length path context, taking into account the locality of data as the context is moved across computing devices.

The first step of the breadth-first search algorithm can include marking vertices from which a search may be performed. These vertices may act as origin vertices. To mark the origin vertices, a list of saved contexts may be iterated. When execution of the query is paused, the current contexts may be saved inside a message together with a hop header. The hop header may contain information including an identifier of a vertex from which the hop originates.

A concurrent map may track origin vertices that can reach any local vertex, together with the paths that can reach them. These paths may be partial, valid, or both. Valid paths may represent paths that are ultimately matched by the algorithm. A discriminant between a valid path and partial path may be a minimum number of hops. A TOP K specifier in the query can give a maximum number of paths included in the reachability map. After the first step of the breadth-first search algorithm, the reachability map may include an entry for each origin vertex. The reachability may indicate that each origin vertex can be reached by itself with a path of length zero.

The second step of the breadth-first search algorithm may include iteratively performing the search. During each iteration, the breadth-first search algorithm may attempt to extend the paths. Each vertex of the graph may be checked. If the vertex is reachable from a particular source with a path of the same length as the current iteration number, then the path may be eligible for extension. The path may be sent as a message to all neighboring vertices of the current vertex. The neighboring vertices may extend the path and save it locally. The second step of the breadth-first search algorithm may be terminated when a maximum number of iterations is reached or when no new valid paths are discovered.

The breadth-first search algorithm may consider various properties of the vertices and of the edges. Edge and vertex providers may be taken into consideration during a search. For example, vertices and edges may be divided into different providers based on some property like their label. That way, the breadth-first search algorithm may avoid iterations on vertices and edges that will not be matched. As another example, the breadth-first search algorithm may consider the specification of the path pattern and may discard vertices and edges that do not satisfy the associated filters. Because these filters may reference one path variable at a time, the filters may be easily evaluated locally without using data other than the vertex identifier or edge identifier. The breadth-first search algorithm may skip paths at a vertex that fails to satisfy a path pattern source vertex filter. When performing a hop, an edge that fails an edge filter may be skipped. After hops are performed, paths may not be saved at vertices that fail a path pattern destination filter.

As the search is carried out, the breadth-first search algorithm may collect path data and include that path data in different path contexts. For example, some data might be collected at a source vertex, while other data might be collected at a destination vertex, after a hop. Each iteration of the breadth-first search tries to extend paths at a current depth. In doing so, a same path might be sent from a single vertex to different target vertices through different edges. To extend a path at the source side, additional size occupied by the extended path may be computed, and the additional data may be sent after having sent the additional path. On the receiving side, local vertex data may be collected before reading the paths to calculate the length of the local additional data. The received path may be copied into a local memory area having a size that is equal to the size of the received path plus the size of the additional data. Using two memory copies, the received path and then the additional data may be copied into the allocated memory. The received path may then be included in the reachability map.

The breadth-first search algorithm may find at most K valid paths that respect given length constraints for each source-destination pair. The breadth-first search algorithm may be interrupted by a user if a maximum depth is reached or if no new valid paths were discovered in a most recent iteration. A path may be valid if it respects a constraint on minimum length and the current destination-source pair has less than K associated paths found.

The breadth-first search algorithm may perform a map reversal (as discussed in step 312 of FIG. 3). The reachability map may be local to the destination vertex. Thus, it may be possible to find all origins that can reach a given destination vertex together with the paths that do so. A reachability map with information on the vertices reachable from a given source may be used to pause and resume execution of the query.

Figure 8:
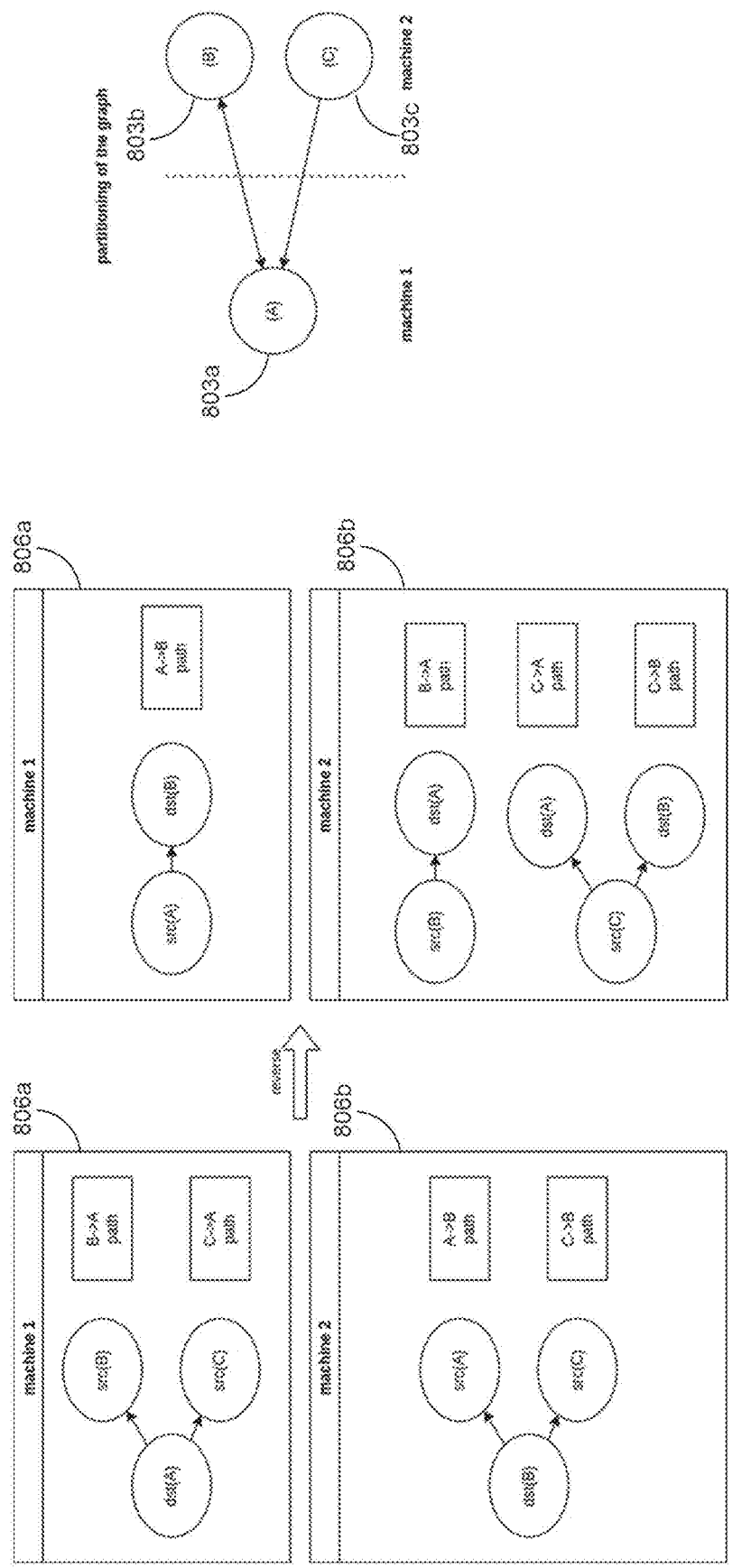
FIG. 8 shows an example of a reversal of a reachability map.

FIG. 8 shows an example of a reversal of a reachability map. Paths of length zero are not shown. In this example, vertex 803*a* is local to computing device 806*a* and vertex 803*b* and vertex 803*c* are local to computing device 806*b*. Map reversal may involve communication between all computing devices. Valid paths may be reversed. As previously discussed, at this point of the breadth-first search algorithm, all paths that respect the lower bound on the length restriction may be valid.

Memory Control

Several approaches may be taken to reduce memory consumption of the asynchronous distributed graph query engine. For example, one approach may include "spilling to disk" the contexts: as the intermediate contexts are materialized while execution of the query is paused, the contexts may be serialized to disk if high memory pressure is detected. This first approach may also be extended to storing the matched paths during execution of the synchronous path matching subjob. This is particularly effective because the synchronous path matching subjob may access paths at the current depth to extend those paths, while older paths may be accessed at resume time. Saving shorter paths to disk may save memory without sacrificing running performance of the synchronous path matching subjob, penalizing only the resume phase.

As another example, another approach may involve batched execution: batching may be implemented at each subjob boundary to limit execution of the query to a batch of vertices at a time. For instance, the vertices of the graph may be split into N equal parts. The initial bootstrap of the query—as well as the rest of the query itself—may be executed on one batch at a time, for N times, progressively accumulating results in same or different frames to be later combined together. This bootstrapping approach may also be implemented at any subjob boundary by bootstrapping on one batch of contexts at a time and executing the rest of the queries as many times as there are batches.

Path Modes

Several example keywords representing path modes may be used to specify properties of paths matched by SHORTEST and CHEAPEST queries:

WALK, which may represent the default path mode.

TRAIL, where path bindings with repeated edges may not be returned.

ACYCLIC, where path bindings with repeated vertices may not be returned.

SIMPLE, where path bindings with repeated vertices may not be returned unless, per path, the repeated vertex is the first and the last in the path.

To implement these path modes, all traversed edges (for TRAIL) and path pattern source vertices (for ACYCLIC and SIMPLE) may be saved into the path context, thereby adding a "ghost" dependency. During runtime, the synchronous path matching subjob may scan the path context to identify repeated edges or vertices (according to the relevant specifier) and discard invalid paths.

All Shortest

An ALL SHORTEST query may match all equivalent shortest paths. For example, if the shortest path between vertex a and vertex b is length N, but multiple paths of length N exist, all of those paths may be matched. The ALL SHORTEST algorithm involves little modification: the protocol for pausing execution of the query may be the same as the SHORTEST algorithm, but all matched shortest paths may be saved and used when execution of the query resumes.

Complex Shortest Path Patterns

In some examples, the shortest path algorithm may handle simple path patterns, which may include a simple vertex-edge-vertex triplet and may not include cross filtering, meaning that every filter may be fully evaluated locally without external data. In other examples, the shortest path algorithm may handle more complex path patterns supporting that support cross filtering relative to a single repetition of a pattern. That is, a filter may reference more than one variable appearing in the path pattern, and the filter may be evaluated during a single repetition of a pattern. To handle complex path patterns, stages may be used within the shortest path algorithm. When handling complex path patterns, a simple hop may be replaced by a more complex pattern. For example, the stages may be built with the construction of a chain representing the path pattern. At each iteration of the shortest path algorithm, a hop to neighboring vertices may be replaced by execution of a chain of stages from the current vertex. The chain of stages may extend the paths and collect data used for horizontal aggregations. The final hop engine may include the extended paths in the reachability map. The shortest path algorithm may synchronize between iterations. Within each iteration, though, execution of stages may proceed in an asynchronous, depth-first, distributed manner, until termination of the iteration.

Cross filters that reference variables from outside the query may be applied to a path. For example, all "e.cost" properties of edges matched during the synchronous patch matching subjob may be less than another e.cost found in the first asynchronous pattern matching subjob or the second asynchronous pattern matching subjob. The shortest and cheapest paths that respect the path pattern filters may be matched. For this reason, filters may be evaluated during the path matching phase. As a result, cross filtering may be feasible if relevant information is obtained before the execution of the synchronous path matching subjob. In this case, the relevant information may be added to a fixed-size portion of the path context. The filter may be evaluated during path pattern matching, and invalid partial paths may be discarded.

Cheapest Paths

The asynchronous distributed graph query engine may enable execution of any type of algorithm at synchronization points during the asynchronous pattern matching subjobs. As an example, pagerank or community detection algorithms could be run on vertices matched by an initial portion of the query, to be used in subsequent portions of the query.

A cheapest path algorithm may be implemented, for example using a variant of Dijkstra's algorithm. This approach may allow a vertex to be expanded multiple times. Filtering may be implemented similarly to the shortest path algorithm. Cost calculation may be executed on a computing device of the source vertex or a computing device of the destination vertex of an expansion. Which of these computing devices is used may depend on whether the cost expression references the source vertex, the edge, or the destination vertex. Complex costs referencing both the source vertex and the destination vertex may result in calculation and communication of partial results of the expression from the source vertex to the destination vertex. The synchronous path matching subjob may produce a complete reachability map. The cheapest path algorithm may be sequential when dealing with a single source vertex, but execution of the cheapest path algorithm may be parallelized in the case of multiple source vertices by executing the explorations in parallel.

In addition, this approach to the cheapest path algorithm may use a global priority queue. The global priority queue may be initially populated with a cheapest known path, which is the path of size zero from the source vertex to itself. At each iteration, the smallest path in the global priority queue may be retrieved. Since the global priority queue is distributed, the computing devices associated with the asynchronous distributed graph query engine may agree on the smallest element at the global level. Due to the way the paths are extended, the last vertex of a path may be local. The cheapest path algorithm may visit the neighboring vertices of this last vertex and attempt to extend the path by one element. If a visit to a neighboring vertex results in a valid path, and less than K paths reaching the last vertex have been matched, the new valid path may be inserted into the global priority queue. Paths that can be matched may also be inserted into a reachability map. Execution of the cheapest path algorithm may terminate when the global priority queue is empty.

As another example, the cheapest path algorithm may be implemented using a variant of the Bellman-Ford algorithm. This approach may involve progressive relaxation. Each vertex may retain the TOP K distance estimates from each source vertex, together with the associated path data. At each step, vertices may communicate "fresh" local path data to their neighbors and mark that local path data as "old". If received paths improve one of the TOP K distance estimates, the local estimates may be replaced with the new "fresh" local path data. Execution of the cheapest path algorithm may terminate when no new "fresh" path is found, meaning that the cheapest path search has converged to a conclusive solution.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
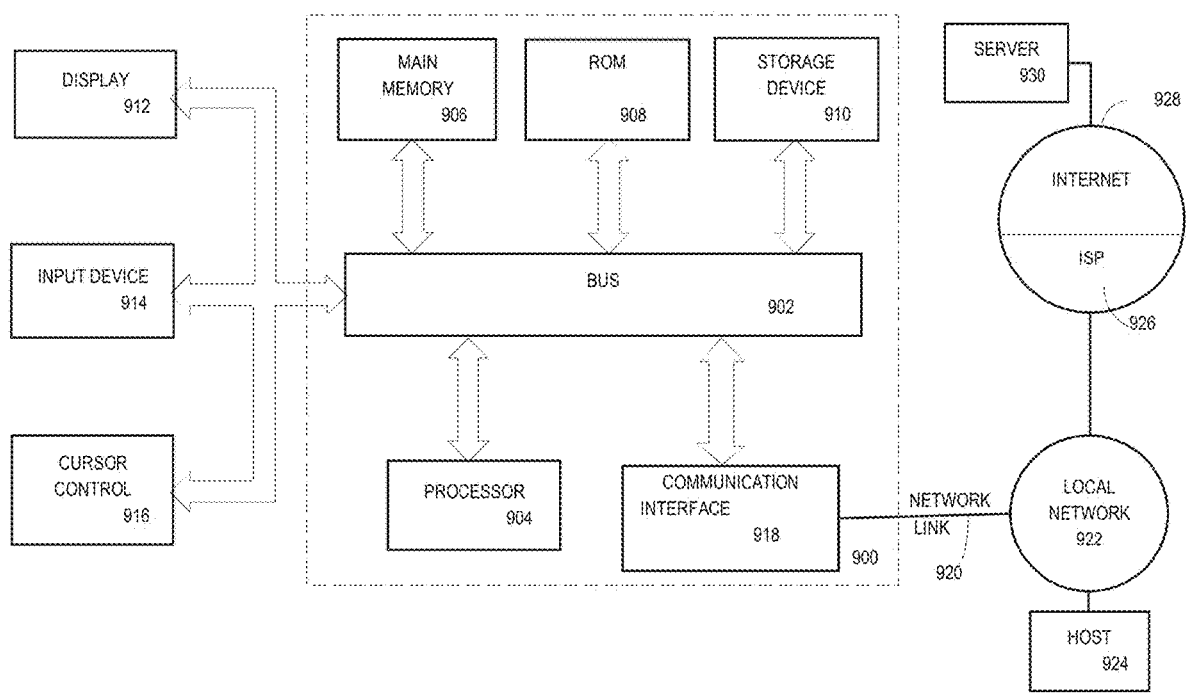
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 10:
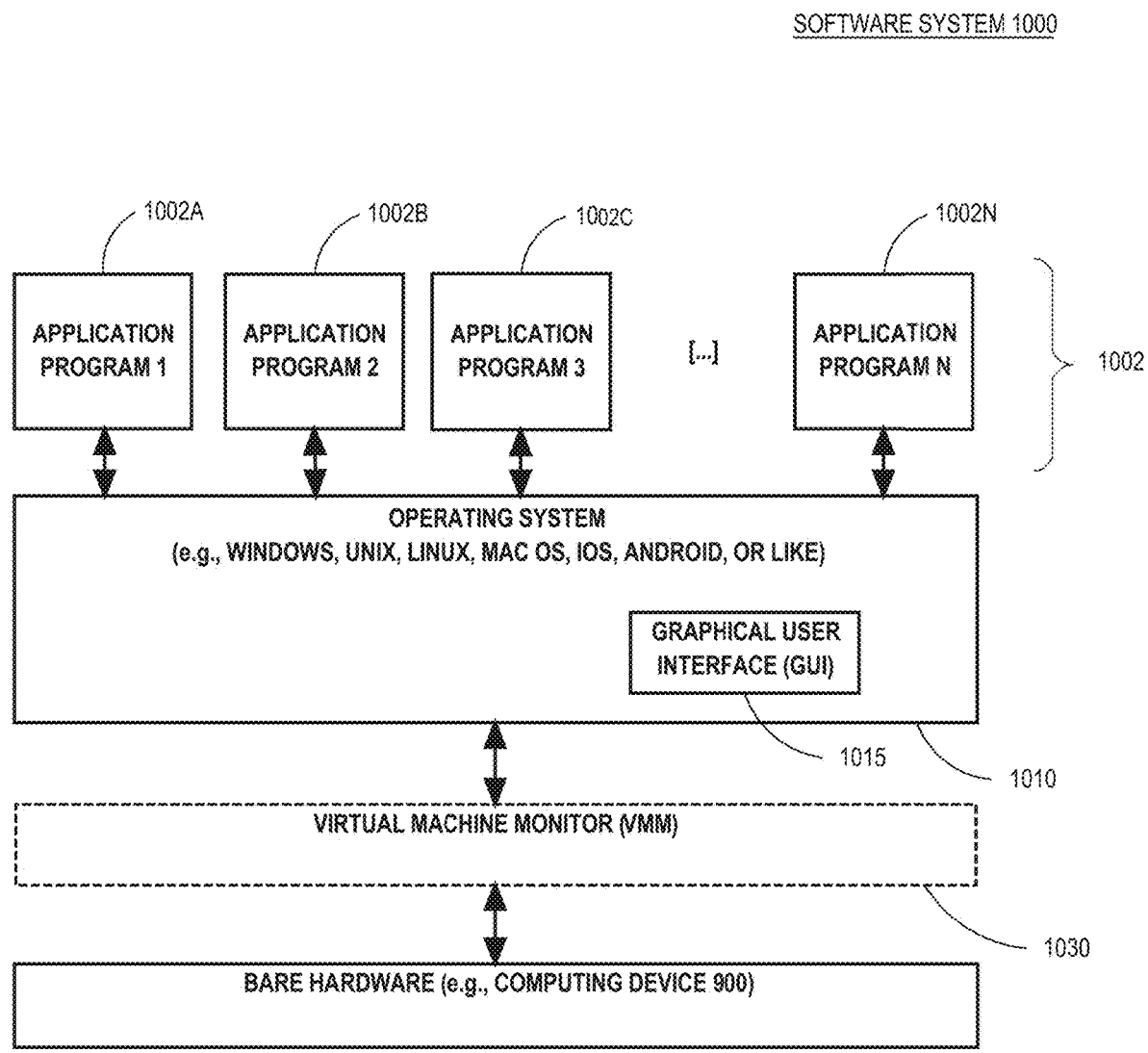
FIG. 10 is a block diagram of a basic software system that may be employed for controlling the operation of a computing system.

FIG. 10 is a block diagram of a basic software system 1000 that may be employed for controlling the operation of computing system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 1000 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

What is claimed is:

1. A method comprising:
    a distributed graph query processing engine executing a graph query in a plurality of computing devices, wherein executing the graph query comprises:
        generating a plurality of subjobs based at least in part on the graph query, the plurality of subjobs comprising an asynchronous pattern matching subjob and a synchronous path matching subjob;
    initiating execution of the asynchronous pattern matching subjob of the plurality of subjobs;
    in response to the asynchronous pattern matching subjob identifying one or more source vertices of a plurality of vertices, pausing the execution of the asynchronous pattern matching subjob;
    generating an output context set comprising the one or more source vertices;
    initiating execution of the synchronous path matching subjob of the plurality of subjobs;
    generating a reachability map based at least in part on one or more matched paths between the one or more source vertices and one or more destination vertices of the plurality of vertices; and
    resuming the execution of the asynchronous pattern matching subjob based at least in part on the output context set and the reachability map;
    wherein the method is executed on the plurality of computing devices.

2. The method of claim 1, wherein individual subjobs of the plurality of subjobs comprise at least one stage, and the at least one stage corresponds to a processing of a vertex.

3. The method of claim 1, wherein the graph query is a SHORTEST query, and the method further comprises:
    determining that a current vertex of a plurality of vertices satisfies one or more filters from the graph query;
    determining that the current vertex is reachable from the one or more source vertices with a path having a same length as a current iteration number; and
    identifying a new path from the one or more source vertices, through the current vertex, and to one or more neighboring vertices of the current vertex.

4. The method of claim 1, wherein the graph query is a CHEAPEST query, and the method further comprises:
    retrieving a cheapest known path from a global priority queue, the cheapest known path having a lowest cost among one or more paths in the global priority queue; and
    inserting, into the global priority queue, a new valid path from the one or more source vertices to a neighboring vertex of a last vertex in the cheapest known path.

5. The method of claim 1, wherein the graph query is a CHEAPEST query, and the method further comprises:
    identifying one or more fresh paths from the one or more source vertices, through a current vertex, and to one or more neighboring vertices of the current vertex;
    in response to determining that a fresh distance estimate associated with the one or more fresh paths improves upon one of a plurality of distance estimates from the one or more source vertices to the one or more neighboring vertices, replacing the one of the plurality of distance estimates with the fresh distance estimate; and designating the one or more fresh paths as old.

6. The method of claim 1, wherein resuming the execution of the asynchronous pattern matching subjob based at least in part on the output context set and the reachability map further comprises:

identifying, in the reachability map, the one or more destination vertices corresponding to the one or more source vertices; and performing a jump to the one or more destination vertices.

7. The method of claim 1, further comprising reversing the reachability map.

8. The method of claim 1, further comprising computing one or more horizontal aggregations for the one or more matched paths.

9. One or more non-transitory storage media storing instructions which, when executed by one or more computing devices, cause:

a distributed graph query processing engine executing a graph query in a plurality of computing devices, wherein executing the graph query comprises:

generating a plurality of subjobs based at least in part on the graph query, the plurality of subjobs comprising an asynchronous patter matching subjob and a synchronous path matching subjob;

initiating execution of the asynchronous pattern matching subjob of the plurality of subjobs;

in response to the asynchronous pattern matching subjob identifying one or more source vertices of a plurality of vertices, pausing the execution of the asynchronous pattern matching subjob;

generating an output context set comprising the one or more source vertices;

initiating execution of the synchronous path matching subjob of the plurality of subjobs;

generating a reachability map based at least in part on one or more matched paths between the one or more source vertices and one or more destination vertices of the plurality of vertices; and resuming the execution of the asynchronous pattern matching subjob based at least in part on the output context set and the reachability map.

10. The one or more non-transitory storage media of claim 9, wherein individual subjobs of the plurality of subjobs comprise at least one stage, and the at least one stage corresponds to a processing of a vertex.

11. The one or more non-transitory storage media of claim 9, wherein the graph query is a SHORTEST query, and the one or more non-transitory storage media, when executed by the one or more computing devices, further cause:

determining that a current vertex of a plurality of vertices satisfies one or more filters from the graph query;

determining that the current vertex is reachable from the one or more source vertices with a path having a same length as a current iteration number; and identifying a new path from the one or more source vertices, through the current vertex, and to one or more neighboring vertices of the current vertex.

12. The one or more non-transitory storage media of claim 9, wherein the graph query is a CHEAPEST query, and the one or more non-transitory storage media, when executed by the one or more computing devices, further cause:

retrieving a cheapest known path from a global priority queue, the cheapest known path having a lowest cost among one or more paths in the global priority queue; and inserting, into the global priority queue, a new valid path from the one or more source vertices to a neighboring vertex of a last vertex in the cheapest known path.

13. The one or more non-transitory storage media of claim 9, wherein the graph query is a CHEAPEST query, and the one or more non-transitory storage media, when executed by the one or more computing devices, further cause:

identifying one or more fresh paths from the one or more source vertices, through a current vertex, and to one or more neighboring vertices of the current vertex;

in response to determining that a fresh distance estimate associated with the one or more fresh paths improves upon one of a plurality of distance estimates from the one or more source vertices to the one or more neighboring vertices, replacing the one of the plurality of distance estimates with the new fresh distance estimate; and designating the one or more fresh paths as old.

14. The one or more non-transitory storage media of claim 9, wherein and the one or more non-transitory storage media causing resuming the execution of the asynchronous pattern matching subjob based at least in part on the output context set and the reachability map further causes:

identifying, in the reachability map, the one or more destination vertices corresponding to the one or more source vertices; and performing a jump to the one or more destination vertices.

15. The one or more non-transitory storage media of claim 9, wherein the one or more non-transitory storage media, when executed by the one or more computing devices, further cause reversing the reachability map.

16. The one or more non-transitory storage media of claim 9, wherein the one or more non-transitory storage media, when executed by the one or more computing devices, further cause computing one or more horizontal aggregations for the one or more matched paths.

17. A system comprising:

one or more computing devices comprising a processor and memory;

machine-readable instructions stored in the memory that, when executed by the processor, cause the one or more computing devices to:

generate a plurality of subjobs based at least in part on a graph query, the plurality of subjobs comprising an asynchronous pattern matching subjob and a synchronous path matching subjob;

initiate execution of the asynchronous pattern matching subjob of the plurality of subjobs;

in response to the asynchronous pattern matching subjob identifying one or more source vertices of a plurality of vertices, pause the execution of the asynchronous pattern matching subjob;

generate an output context set comprising the one or more source vertices;

initiate execution of the synchronous path matching subjob of the plurality of subjobs;

generate a reachability map based at least in part on one or more matched paths between the one or more source vertices and one or more destination vertices of the plurality of vertices; and resume the execution of the asynchronous pattern matching subjob based at least in part on the output context set and the reachability map.

18. The system of claim 17, wherein the graph query is a SHORTEST query, and the machine-readable instructions, when executed by the processor, further cause the one or more computing devices to:
   determining that a current vertex of a plurality of vertices satisfies one or more filters from the graph query;
   determining that the current vertex is reachable from the one or more source vertices with a path having a same length as a current iteration number; and
   identifying a new path from the one or more source vertices, through the current vertex, and to one or more neighboring vertices of the current vertex.

19. The system of claim 17, wherein the graph query is a CHEAPEST query, and the machine-readable instructions, when executed by the processor, further cause the one or more computing devices to:
   retrieving a cheapest known path from a global priority queue, the cheapest known path having a lowest cost among one or more paths in the global priority queue; and
   inserting, into the global priority queue, a new valid path from the one or more source vertices to a neighboring vertex of a last vertex in the cheapest known path.

20. The system of claim 17, wherein the graph query is a CHEAPEST query, and the machine-readable instructions, when executed by the processor, further cause the one or more computing devices to:
   identifying one or more fresh paths from the one or more source vertices, through a current vertex, and to one or more neighboring vertices of the current vertex;
   in response to determining that a fresh distance estimate associated with the one or more fresh paths improves upon one of a plurality of distance estimates from the one or more source vertices to the one or more neighboring vertices, replacing the one of the plurality of distance estimates with the new fresh distance estimate; and
   designating the one or more fresh paths as old.

\* \* \* \* \*